UNITED STATES PATENT OFFICE.

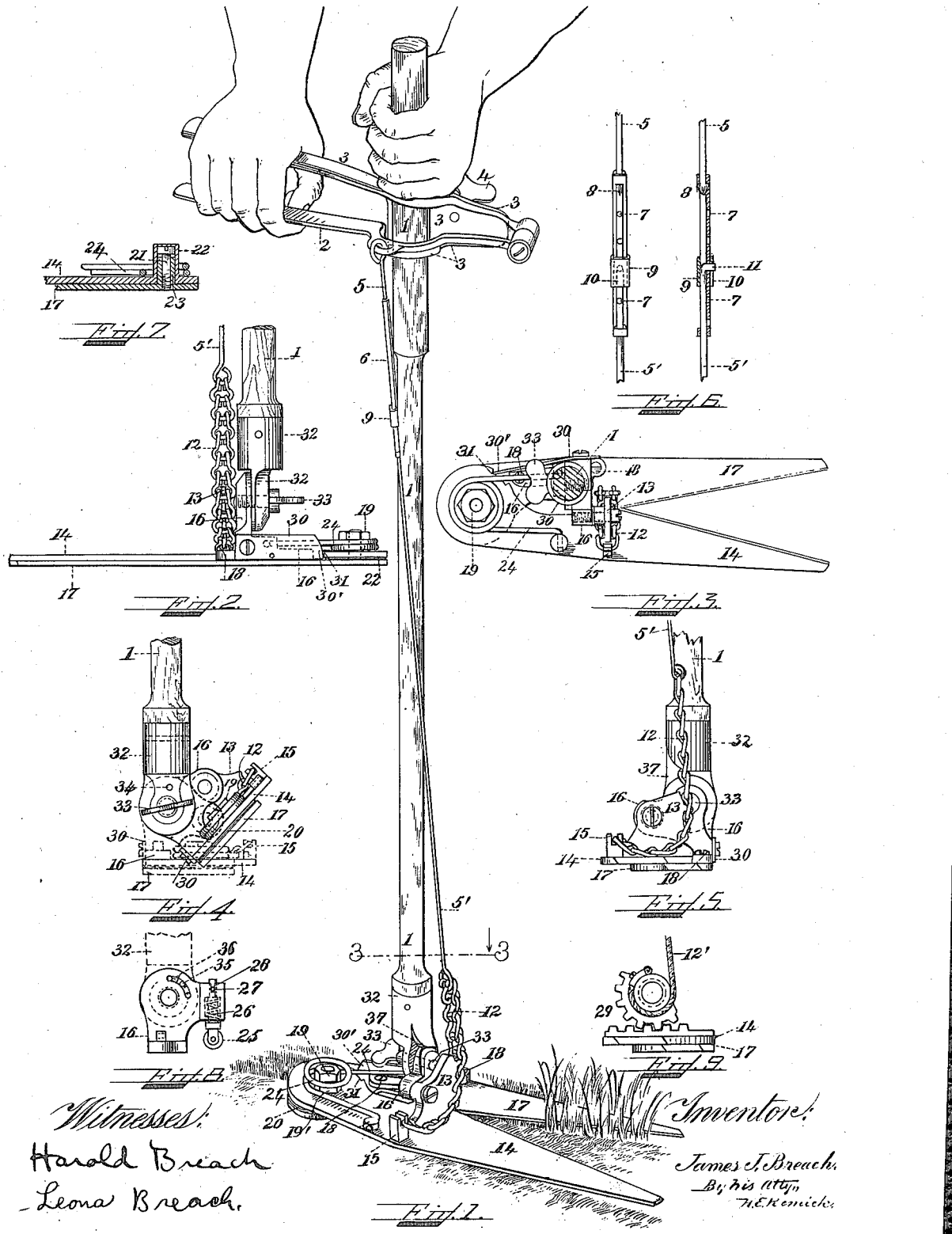

JAMES J. BREACH, OF SOUTH WEYMOUTH, MASSACHUSETTS, ASSIGNOR TO EDWARD B. MERRIMAN, OF BOSTON, MASSACHUSETTS, AND FRANK W. MERRIMAN, OF CAMBRIDGE, MASSACHUSETTS, COPARTNERS UNDER THE FIRM-NAME OF MERRIMAN BROTHERS, OF BOSTON, MASSACHUSETTS.

LAWN-EDGE TRIMMER.

1,135,989.  Specification of Letters Patent.  Patented Apr. 20, 1915.

Application filed November 29, 1911. Serial No. 663,148.

*To all whom it may concern:*

Be it known that I, JAMES J. BREACH, a citizen of the United States and a resident of South Weymouth, in the county of Norfolk and State of Massachusetts, have invented certain new and useful Improvements in Lawn-Edge Trimmers, of which the following is a specification.

My invention relates to new and useful improvements in associate cutting blades for use on lawns, and particularly adapted to trimming the ragged edges left about borders, garden paths and generally inaccessible places following the—in this respect—inefficient cutting of the lawn mower.

The objects of my improvement are, first, the production of an implement effective as in the final grass trim and finish; second, to provide a grass cutter whose blades may be adjusted at various shearing angles to suit the slope of the lawn or trend of ground over which the instrument is used, third; the combination of a swinging blade with a fixed blade to obtain extreme accuracy in trimming along straight borders, fourth; to enable the operator to complete such labor more speedily, with less effort while assuming an erect position, and in other essentials hereinafter described and claimed. I attain said objects through the mechanism illustrated in the annexed drawing forming a part of this specification, wherein:

Figure 1 is a perspective of my improved lawn trimmer in practical use. Fig. 2 denotes a left side elevation, Fig. 3 is a plan of the cutters and actuating mechanism from the dashed line 3—3 of Fig. 1. Fig. 4 indicates a rear elevation, with the blades normal in dotted lines, and at an intermediate obtuse cutting angle. Fig. 5 exhibits the implement in front elevation, Fig. 6, are fragmentary views in rear elevation and longitudinal section exhibiting the manner of lengthening the actuating rods. Figs. 7, 8 and 9 are modified constructions of certain parts hereinafter described.

Corresponding numerals of reference identify similar features throughout the drawing, referring to which—

1 denotes the supporting staff carrying the hand-grip 2 pivoted to the grip-frame 3, which is vertically adjusted on said staff and there held by the thumb screw 4. To the hand-grip 2, is secured the actuating rods 5—5' provided with an intermediate take-up member 6, semicircular or U shaped, and having a series of perforations 7, which receive the end 8 of said rod 5 which is soldered or otherwise attached thereto. The interval between the rods being determined, the upset end 11 of said rod 5' is then inserted in one of the several perforations 7, and therein retained by the sliding sleeve 9, having a longitudinal slot 10, allowing it to be forced down over the upset end 11 which also serves as a stop limiting the further movement of the sleeve. The purpose of this adjustment is to accommodate various lengths of the staff to users of different stature. To the end of said rod 5' is attached a chain 12, or cord 12', as preferred; the former engaging with the segmental reciprocating sprocket 13, and anchored to the movable cutting blade 14 by the bifurcated stud 15. Said sprocket 13 is semi-rotatably mounted on the frame or casting 16, attached to, and supported on the fixed cutting blade 17 by rivets or screws 18, said blade also pivotally upholding the coöperating blade 14 by a screw threaded bolt and primary and secondary nuts 19—19' with interposed washers 20, or by the capped adjusting screw 21 (Fig. 7) either of which devices may be preferred. The latter consists of a cap 22, integral with the heel of the blade 14, which receives the internal screw threaded journal 23, integral with the blade 17 in a manner to form an axial bearing. Said adjusting screw 21 seated in said bearing controls the distance intervening said blades, in lieu of the washers 20 previously mentioned, the functions being the same with either construction.

An expansion coil spring 24, one end of which is anchored in the casting 16, its opposite end to the blade 14, holds said blade normally out of cutting contact with the fixed blade 17, as observed in Fig. 1. The interposed washers 20, allow a slight depression of the swing blade 14, which is augmented through the action of said sprocket and chain caused by the downward tension thereof, the anchorage on the stud 15 being on a higher plane than the annular teeth of the member 13. This secures the declination of said blade and the cutting edges, insuring keenness for trimming.

Substantially a similar result is effected by the rotary traveler 25 (Fig. 8) suspended in the frame 16, and traversing the blade 14, the pressure being regulated by the inclosed spiral spring 26. The alinement transversely of said traveler being secured by the pin 27 seated in the vertical slot 28. With this device the oscillation of the blade 14, is preferably attained by the segmental pinion and rack 29, attached to the movable blade 14, (Fig. 9). Through the use of either of said devices the cutting edges of the blades in closing are held in juxtaposition to accomplish the most efficient results. To limit the swing of the blade 14, a resisting spring 30 is attached to the frame, its free end 30' seated in the reëntering notch or catch 31 in the heel of said blade. Pressing the end 30' of said spring away from the catch 31 allows the blade to open, thus making both blades accessible for sharpening.

Co-acting with the frame 16 will be observed (Fig. 2) the socket or secondary frame 32, forming the terminal of, and pinned to the staff 1, the thumb screw 33 detachably uniting these members in a manner to secure the organized cutting mechanism at right and obtuse angles (Fig. 4) to conform to the ground formation of the grass edgings of foot-ways, terraces, etc., that require pruning.

The impermanent union of the frame 16 with the socket frame 32, is by means of the inwardly projecting stud 34, therein (Fig. 4) which seats when said parts are contiguous in one of the series of pockets 35 (Fig. 8) which are concentric with the binding thumb screw 33, said pockets forming the deeper portions of the depression or groove 36 and also limiting the lateral swing of said frame. The slight retraction of the binding screw 33 allowing the frame 32 to fall away from the frame 16 when desired to position the blades laterally, as in Fig. 4, the stud 34 traversing said depression 36 thence pocketing. The thumb screw 33 is then tightened, with the angular cutting position secured.

To accommodate the several positions of the supporting frame and blades, and to present a bearing for the aggroupment of the socket is fashioned as at 37 (Fig. 1).

To avoid any necessity of adjusting the actuating mechanism 5, 12 and 13 to the various obtuse angles the blades may assume, the circumference of the segmental sprocket and the location of its bearing must conform to a certain radius with the binding screw 33, this position obtained, the differential movement of the organized members can be accomplished without any slackening of the chain and rod, or interference with the proper performance of the implement in all of its functions.

I am aware that instruments adapted to similar purposes herein alluded to are anticipated in the art. I am, however, unaware of lawn trimmers that are provided with vertically adjustable staffs, or that have a reciprocating blade cutting against a stationary blade, and while I have described the preferred manner of construction, I desire not to limit myself to the precise details herein shown, but may vary the same without departing from the true spirit of my invention, which, having ascertained, I desire to secure by Letters Patent of the United States, and

I claim —

1. A lawn edge trimmer comprising a pair of shear blades, an upwardly-extending staff connected at its lower end to one of the blades and adjustable with respect to the same on an axis extending lengthwise of said blade, a hand grip mounted to reciprocate on the upper portion of said staff, connections extending from the hand grip to the other blade for drawing the blades together, and a spring for separating the blades.

2. A lawn edge trimmer comprising a pair of shear blades, an upwardly-extending staff connected at its lower end to one of the blades and adjustable with respect to the same on an axis extending lengthwise of said blade, a hand grip mounted to reciprocate on the upper portion of the staff, means for adjusting the hand grip lengthwise of said staff, longitudinally-adjustable connections between the hand grip and the other blade for drawing the blades together, and a spring for separating the blades.

3. A lawn edge trimmer comprising a pair of shear blades, an upwardly-extending staff connected to one of the blades and adjustable with respect to the same on an axis extending lengthwise of the blades, a movable hand grip carried by the upper portion of the staff and adjustable upward and downward thereon, and blade-operating connections between the hand grip and the blades comprising two rods and a take-up member connecting the same, said take-up member having a series of perforations each adapted to receive the bent-over end of one of the rods and also having a sliding sleeve to engage the latter rod and hold it in place.

4. A lawn trimmer, comprising a pair of spring shears; a frame secured to one blade thereof; a bearing member on said frame; an anchor upon the other blade; a flexible member movably engaging said bearing member; one end of said flexible member being secured to said anchor; a staff pivotally connected to said frame; and manually operated means connected with the other free end of said flexible member; all designed to operate said shears.

5. A lawn trimmer, comprising a pair of spring shears; a frame secured to one blade thereof; a segmental member pivoted to the frame; an anchor upon the other blade; a flexible member engaging the said segment member, one end of said flexible member being secured to said anchor; a staff pivotally connected to said frame; and manually operated means connected with the other free end of said flexible member; all designed to operate said shears.

6. A lawn trimmer, comprising a pair of spring shears; a frame secured to one blade thereof; a segmental member pivoted to the frame; an anchor upon the other blade; a flexible member, engaging the said segment member, one end of said flexible member being secured to said anchor; a staff pivotally connected to said frame; and manually operated means connected with the other free end of said flexible member; the pivots connecting the staff to the frame, and the segment to the frame, being located so that when the shaft is inclined to the plane of the shears, the operative length of the manually operated means remains the same.

7. A lawn trimmer, comprising a pair of spring shears; a frame secured to one blade thereof; a segmental member secured to the frame; an anchor upon the other blade; a flexible member, engaging the curved surface of said segment member, one end of said flexible member being secured to said anchor; a staff pivotally connected to said frame; and manually operated means connected with the other free end of said flexible member; the connection between the segment and the frame, the radius of the segment, and the position of the anchor, all being arranged so that tension upon the flexible member pulls the anchor and causes the cutting edge of its blade not only to approach but also to press against the cutting edge of the other blade.

8. A lawn trimmer, comprising a pair of spring shears; a frame secured to one blade thereof; a segmental member pivoted to the frame; an anchor upon the other blade; a flexible member, engaging the curved surface of said segment member, one end of said flexible member being secured to said anchor; a staff pivotally connected to said frame; and manually operated means connected with the other free end of said flexible member; the pivot connecting the segment to the frame, the radius of the segment, and the position of the anchor, all being arranged so that tension upon the flexible member pulls the anchor and causes the cutting edge of its blade not only to approach but also to press against the cutting edge of the other blade.

9. In a lawn trimmer, a frame designed to be fixed to a cutting blade; a socket frame for the reception of a staff; a thumb screw to pivotally connect the same; an inwardly projecting stud in one frame; a concentric groove with a series of pockets in the bottom thereof, in the other frame, to be engaged by said stud, all designed to adjust and secure the frame and the socket frame in the desired position, and to limit the extreme relative motion between the same.

In testimony whereof I have affixed my signature, in presence of two witnesses.

JAMES J. BREACH.

Witnesses:
 MILAN F. STEVENS,
 THOS. W. REED.